United States Patent
Eisenberg

(12) 
(10) Patent No.: US 6,331,866 B1
(45) Date of Patent: Dec. 18, 2001

(54) DISPLAY CONTROL FOR SOFTWARE NOTES

(75) Inventor: Peter M. Eisenberg, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/162,216

(22) Filed: Sep. 28, 1998

(51) Int. Cl.[7] .................................... G06F 3/00
(52) U.S. Cl. ................ 345/784; 345/786; 345/804; 345/764; 345/787; 707/512
(58) Field of Search ................ 345/341, 973, 345/345, 155, 346, 326, 123, 125, 339, 350, 113, 114, 118; 707/512

(56) References Cited

U.S. PATENT DOCUMENTS

| | | | |
|---|---|---|---|
| 4,734,689 | | 3/1988 | Kurakake ................ 340/726 |
| 4,931,987 | | 6/1990 | Kawakami ............... 364/900 |
| 5,038,138 | | 8/1991 | Akiyama et al. ......... 340/724 |
| 5,196,838 | | 3/1993 | Meier et al. ............. 340/724 |
| 5,333,247 | | 7/1994 | Gest et al. .............. 395/138 |
| 5,339,391 | * | 8/1994 | Wroblewski et al. ..... 345/157 |
| 5,479,600 | * | 12/1995 | Wroblewski et al. ..... 345/157 |
| 5,559,942 | * | 9/1996 | Gough et al. ........... 345/349 |
| 5,581,681 | | 12/1996 | Tchao et al. ............ 707/541 |
| 5,590,256 | | 12/1996 | Tchao et al. ............ 395/787 |
| 5,646,646 | | 7/1997 | Inoue et al. ............. 345/123 |
| 5,689,666 | * | 11/1997 | Berquist et al. ......... 345/345 |
| 5,806,079 | | 9/1998 | Rivette et al. ........... 707/512 |
| 5,809,318 | * | 9/1998 | Rivette et al. ........... 707/512 |
| 5,821,931 | * | 10/1998 | Berquist et al. ......... 345/346 |
| 5,845,301 | * | 12/1998 | Rivette et al. ........... 707/512 |
| 5,852,436 | * | 12/1998 | Franklin et al. ......... 345/326 |
| 5,903,267 | * | 5/1999 | Fisher ................... 345/341 |
| 6,049,334 | * | 4/2000 | Bates et al. ............. 345/332 |

FOREIGN PATENT DOCUMENTS

| | | |
|---|---|---|
| 0 488 925 A2 | 6/1992 | (EP). |
| 0 509 160 A1 | 10/1992 | (EP). |
| 0 631 231 A2 | 12/1994 | (EP). |
| 0 651 316 A1 | 5/1995 | (EP). |
| 07129561 | 5/1995 | (JP). |

OTHER PUBLICATIONS

Lemieux P, "Lotus 1–2–3 for Windows," Institute of Electrical Engineers, Database Accession No. 4265709 (XP002125442), Abstract (1992).

* cited by examiner

Primary Examiner—Raymond J. Bayerl
Assistant Examiner—Cuong T. Thai
(74) Attorney, Agent, or Firm—Shumaker & Sieffert, P.A.

(57) ABSTRACT

A method for controlling presentation of the content of a note on a display facilitates the editing of note content by a user. A computer user can view different portions of the note content quickly and easily, particularly when the note content extends beyond the displayed portion. A user can gain easy access to different portions of a note by simply clicking at desired positions along a content extent bar. The content extent bar can be made to indicate positioning from the beginning of the note content to the end. A current view bar indicates the position of a currently displayed portion of the note content. The user can drag the current view bar to display another portion of the note content. A cursor indicator can be displayed relative to the content extent bar. Upon selection of the cursor indicator, a portion of the note content containing the edit cursor is displayed. In the event the user marks a portion of the text, e.g., for a cut, copy, or formatting operation, a selected content indicator also can be displayed relative to the content extent bar. The selected content indicator can be sized to indicate the extent and position of the selected portion of the note content relative to the content extent.

38 Claims, 2 Drawing Sheets

DISPLAY CONTROL FOR SOFTWARE NOTES

TECHNICAL FIELD

The present invention relates to creation and editing of software notes and, more particularly, to techniques for controlling the presentation of software notes on a display.

BACKGROUND

Adhesive-backed paper notes have become ubiquitous both in the workplace and at home. Paper Post-it® notes, for example, provide a convenient way to quickly jot down information for later reference. Users often rely on paper Post-it® notes to annotate documents, provide reminder notes, record the substance of telephone conversations, or manage contact information. Paper Post-it® notes can be attached to various surfaces such as documents, desktops, telephones, and the like. The note can be easily repositioned on a given surface, or removed for attachment to another surface. Also, the user can readily edit the notes as necessary.

Notes can be particularly useful to computer users. A computer user typically uses a computer to create and edit a variety of documents. In many cases, annotation of the documents is desirable. Also, the computer user ordinarily receives numerous e-mail messages and telephone calls throughout the day. Under these circumstances, computer users often rely on notes to quickly record information that will be needed later. Paper Post-it® notes offer great convenience to the computer user. It can be even more convenient, however, to create a software note on the computer rather than manually prepare a paper note.

The note created by the computer user may relate, for example, to the contents of one or more documents being edited or reviewed by the user on the computer display. In this case, it may be more convenient to associate the note with a document and then store the document and the note together in computer memory. Alternatively, the note may serve as a reminder that is more visible to the user if placed on the computer desktop, perhaps with an audible alarm. Also, creation of a software note can facilitate later manipulation of its contents for incorporation in a document or communication to another user.

Application programs exist for the creation of software notes. Post-it® Software Notes, for example, available from Minnesota Mining and Manufacturing Company (3M), of St. Paul, Minn., allows a user to create, edit, delete, move and save software notes among multiple documents and across the computer desktop. The software note contents can be entered in text form by keyboard or by copying a portion of a document. In addition, a wide range of graphic objects, and other multimedia objects, can be associated with a software note. In each case, the software note can be date and time-stamped, and associated with a particular document or event.

A paper note has a finite content area determined by the size of the note. Once the user has filled a note, any remaining content must be written on a new note. A software note, in contrast, can provide a content area that extends well beyond the boundaries of the note presented on the computer display. In particular, a software note can be presented on the computer display in the form of a note having a given size. The size of the software note typically can be expanded, however, to show added content. Also, the user typically is allowed to enter content that exceeds the boundaries of the visible note. Thus, a software note affords greater capacity than a single paper note, but can be more difficult to view when the contents are lengthy.

SUMMARY

The present invention is directed to a method for controlling presentation of the content of a software note on a display, and an article of manufacture encoded with computer-readable program code arranged such that, upon execution by a computer, the computer performs such a method. The method is particularly useful for software notes, but may find application for other software content containers.

The method facilitates the editing and review of the content of a software note presented on a computer display by a user. The method enables a computer user to view different portions of the note content quickly and easily, particularly when the note content extends beyond the displayed portion. Indeed, in some embodiments, the method can provide direct access to particular portions of the note content. In this manner, the workflow in creating and editing a note is made more efficient.

To allow ease of access to different portions of a software note, the method can make use of a content extent bar. The content extent bar is representative of the extent of the note content, from beginning to end, including those portions outside of a presently displayed area. A user can specify a position on the content extent bar. The specified position is representative of a corresponding position in the note content. In response, a different portion of the note content proximate to the corresponding position can be displayed. In this manner, the user gains direct access to the specified portion of the note content.

The content extent bar can be displayed to extend in either a vertical or horizontal direction. The act of displaying a different portion of the note content specified on the content extent bar may include, in either case, moving vertically to the different portion in the note content. Thus, the content extent bar is not necessarily indicative of vertical or horizontal positioning, but rather positioning from the beginning of the note content to the end.

A current view bar can be displayed relative to the content extent bar to indicate the position of a currently displayed portion of the note content. The current view bar is moved relative to the content extent bar upon display of a different portion of the note content, thereby indicating the current position of the different portion within the overall content extent.

Also, in response to user input specifying movement of the current view bar, a different portion of the note content can be displayed based on the position of the current view bar following movement. In other words, the user can drag the current view bar relative to the content extent bar to specify the display of another portion of the note content.

To help the user locate an edit cursor within text content, the method can include displaying a cursor indicator relative to the content extent bar to indicate the position of an edit cursor within the overall content extent. In response to user input selecting the cursor indicator, a portion of the note content containing the edit cursor is displayed. This feature helps save time in locating the edit cursor for text entry and, again, provides direct access to a desired portion of the note content.

In the event the user marks a portion of the text, e.g., for a cut, copy, or formatting operation, a selected content indicator also can be displayed relative to the content extent bar. In this case, the selected content indicator indicates a position of a selected portion of the note content within the overall content extent. In response to user input selecting a different portion of the note content, the selected content indicator can be moved to indicate the position of the different selected portion. Also, the selected content indicator can be sized to indicate the length of the selected portion of the note content relative to the overall content extent.

In one embodiment, the present invention provides a method for controlling presentation of the content of a note on a display, the method comprising displaying a portion of the note content, displaying a content extent bar representative of the extent of the note content, processing user input specifying a position on the content extent bar, the specified position being representative of a corresponding position in the note content, and displaying a different portion of the note content proximate to the corresponding position.

In another embodiment, the present invention provides a method for controlling presentation of the content of a note on a display, the method comprising displaying a portion of the note content, displaying a content extent bar representative of the extent of the note content, and displaying a cursor indicator relative to the content extent bar to indicate a position of an edit cursor within the content extent.

In a further embodiment, the present invention provides a method for controlling presentation of the content of a note on a display, the method comprising displaying a portion of the note content, displaying a content extent bar that indicates the extent of the note content, and displaying a selected content indicator relative to the content extent bar to indicate a position of a selected portion of the note content within the content extent.

In an additional embodiment, the present invention provides a method for controlling presentation of a note displayed on a computer display, the method comprising displaying a portion of the content of the note, displaying a content extent bar with a horizontal orientation on the computer display, the content extent bar indicating the extent of content of the displayed note, displaying a current view bar that is movable relative to the content extent bar to indicate a position of a currently displayed portion of the note content within the content extent, displaying a cursor indicator that is movable relative to the content extent bar to indicate a position of an edit cursor within the content extent, displaying a selected content indicator that is movable and sizable relative to the content extent bar to indicate a position and size of a selected portion of the note content within the content extent, processing user input specifying a different portion of the note content to be displayed, displaying a different portion of the note content by moving vertically to the different portion in the note content, and moving the current view bar relative to the content extent bar to indicate a position of the different portion of the note content within the content extent.

In other embodiments, the present invention provides an article of manufacture encoded with computer-readable program code arranged such that, upon execution by a computer, the computer controls presentation of the content of a note on a display according to any of the method embodiments described above.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
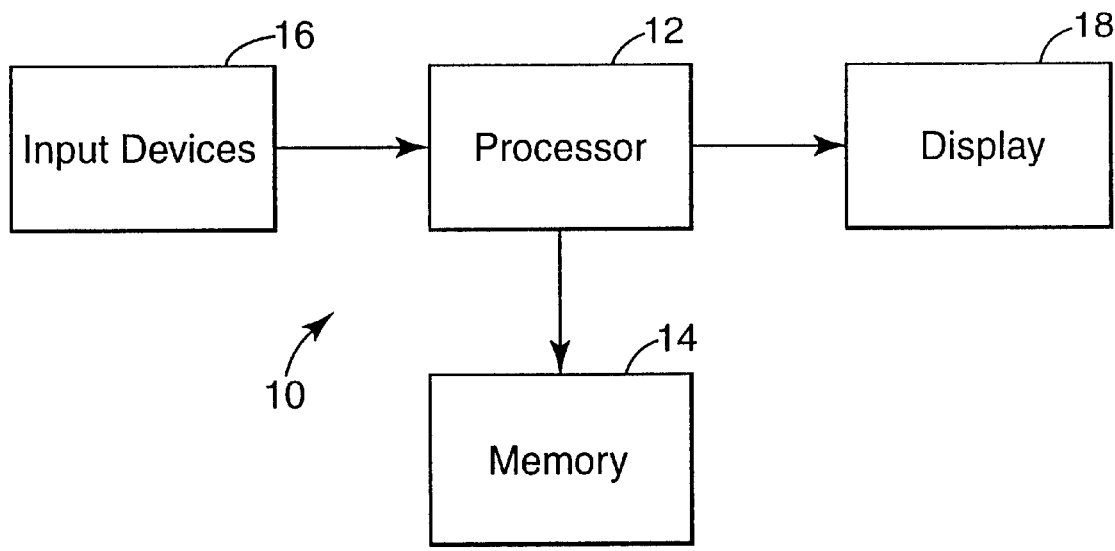
FIG. 1 is a functional block diagram of a computing system.

FIG. 1 is a functional block diagram of an exemplary computing system 10 for implementation of a software notes application. As shown in FIG. 1, system 10 may include a processor 12, a memory 14, input devices 16, and a display device 18. Processor 12 may take the form of a central processing unit (CPU) incorporated in a general purpose computer, such as a PC, Macintosh, or workstation. Memory 14 stores program code for execution by processor 12, including operating system code and application program code, and is generally representative of a hard drive or removable media drive in combination with random access memory (RAM) accessed by processor 12. Input devices 16 include input media for entry of user input, such as a keyboard, mouse, and the like. Display device 18 includes a viewing screen that provides graphic output, such as a CRT or flat panel monitor. Processor 12 communicates with input devices 16, display device 18, and printer 20 via one or more input/output controllers (not shown in FIG. 1).

Memory 14 stores application program code arranged to facilitate the creation of software notes on a computer desktop. The software note contents can be entered via input devices 16, e.g., by entry of text using a keyboard, or by cut-and-paste operations. In addition, a wide range of textual and graphic objects can be imported into the software notes. The software notes can be attached to particular documents or to the computer desktop. Also, the software notes can be date and time-stamped, if desired, and associated with alarms. An example of an exemplary software notes application is Post-it® Software Notes, version 1.5, available from Minnesota Mining and Manufacturing Company (3M), of St. Paul, Minn. The application program code may conform substantially to the Post-it® Software Notes version referenced above. In accordance with the present invention, however, the application program code is further arranged to execute a method for controlling presentation of the content of a note on a display when the note content extends beyond a portion of the note visible on display device 18.

The application program code can be carried on an article of manufacture and arranged such that, upon execution, system 10 performs a method for controlling presentation of note content on a display. The application program code can be stored, for example, on a hard drive and uploaded into RAM, as necessary, for execution by processor 12. Alternatively, the application program code can be stored on any of a variety of removable storage media, e.g., CD-ROM, DVD-ROM, magneto-optic disk, phase change disk, magnetic tape, removable hard disk, or floppy diskette, and uploaded to RAM for execution. In general, upon execution of the application program code, processor 12 is configured to process user input received from input devices 16 and drive display device 18 to provide the user with interactive output. With the program code, the user can create, edit, delete, move and save software notes among multiple documents and across the computer desktop shown on display device 18.

Figure 2:
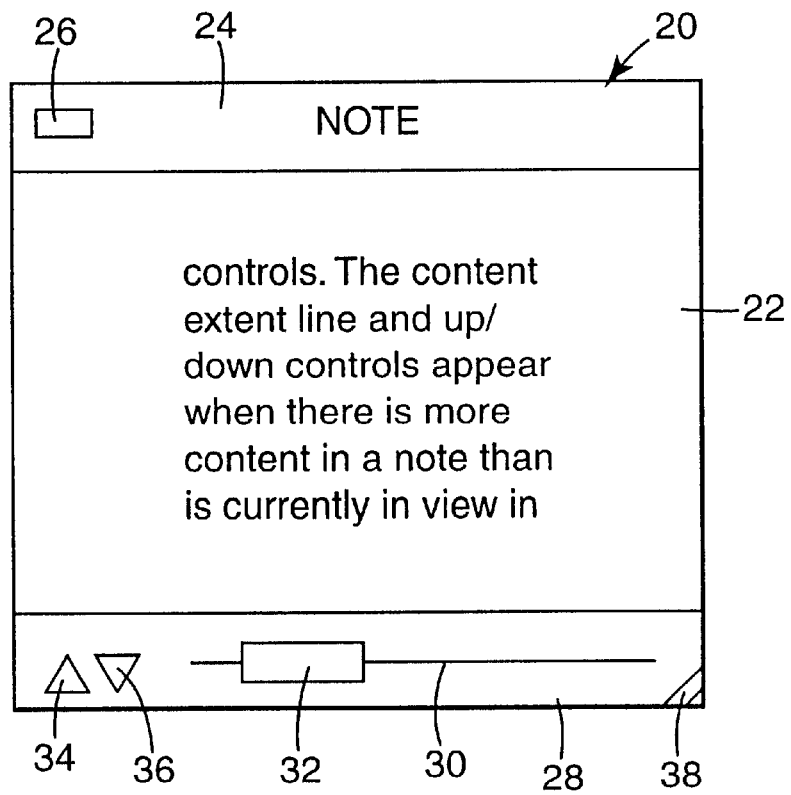
FIG. 2 is a diagram of a software note illustrating the concept of a content extent bar and current view bar.

FIG. 2 is a diagram of a software note 20 illustrating the concept of a content extent bar and current view bar. As shown in FIG. 2, software note 20 includes a note content area 22 for entry of text and/or graphic objects. Also, software note 20 may include a command bar 24 having a command button 26. When a user clicks on command button 26 with a mouse or other pointing device, a pull-down menu of commands, e.g., print, send, color, font, etc., is presented on display device 18. Also, a user can move software note 20 by clicking on command bar 24 and dragging the note to another position. In these respects, software note 20 generally corresponds to software notes generated by Post-it® Software Notes, version 1.5.

The application program code executed by processor 12 can be further arranged, however, such that software note 20 includes a scroll bar area 28 containing a content extent bar 30, a current view bar 32, and up and down controls 34, 36, respectively. As is apparent from FIG. 2, the contents of software note 20 extend beyond the visible content area 22 shown on display device 18. The application program code can be arranged such that scroll bar area 28 is persistently displayed with note 20. Alternatively, scroll bar area 28 can be hidden until the contents of software note 20 extend beyond content area 22. Software note 20 can be resized to view additional portions of content area 22, e.g., by dragging a resize handle 38. Scroll bar area 28 can be designed, however, to facilitate the editing and review of the content of software note 20 by a user without the need for note resizing. With scroll bar area 28, a user can quickly and easily view other portions of the note content, making workflow more efficient.

Content extent bar 30 and current view bar 32 provide easy access to other portions of software note 20. In particular, content extent bar 30 provides a representation of the extent of the note content, from beginning to end, including those portions outside of the presently displayed content area 22. Current view bar 32 is sized in proportion to the amount of content visible within content area 22 relative to the overall content extent represented by content extent bar 30. In addition, current view bar 32 resides at a position along content extent bar 30 that corresponds to the position of the content visible within content area 22. Thus, for shorter note content, current view bar 32 may occupy a larger portion of content extent bar 30. In contrast, current view bar 32 will occupy a smaller portion of content extent bar 30 for longer note content.

With further reference to FIG. 2, content extent bar 30 can take the form of a simple line or bar. The line or bar can be solid or dashed, as desired. Display of current view bar 32 to move, or "slide," along content extent bar 30 is convenient. Current view bar 32 can be displayed differently, however, provided that it still conveys a sense of relative position of the note content visible in content area 22. For example, current view bar 32 could be displayed adjacent, i.e., above or below, content extent bar 30. Like content extent bar 30, current view bar 32 could be solid or dashed, as desired. To enhance visibility, different colors may be desirable for content extent bar 30 and current view bar 32.

To display a different portion of the note content, a user can enter user input specifying a position along content extent bar 30. For example, the user can simply click on a position along content extent bar 30, e.g., with a mouse or other pointing device. In response, processor 12 causes display device 18 to reveal another portion of the note contents that corresponds to the user specified position. In this manner, content extent bar 30 provides the user with one-click direct access to different portions of the note content. Specifically, clicking on content extent bar 30 results in display of a portion of the note content residing at the specified position, in contrast to simply scrolling the content backward or forward by a fixed amount. The displayed content can be centered about the specified position. In other words, the content can be displayed such that the specified position falls approximately midway within content area 22.

As additional content is revealed within content area 22, display device 18 moves current view bar 32 to a position commensurate with the position of the visible content. Current view bar 32 not only specifies the position of visible content, however, but also provides an alternative means to display additional content. In particular, using a mouse or other pointing device, the user can simply drag current view bar 32 along content extent bar 30 to a desired position. In response, processor 12 causes display device 18 to reveal a different portion of the note content within content area 22 that corresponds to the new position of current view bar 32. In this case, the displayed content can be centered about the position specified by the midpoint of current view bar 32.

Content extent bar 30, as shown in FIG. 2, can be displayed to extend in a horizontal direction. The act of displaying a different portion of the note content specified on content extent bar 30 may include, however, moving vertically to the different portion in the note content. In this case, content extent bar 30 need not be indicative of vertical or horizontal positioning, but rather positioning from the beginning of the note content to the end. In other words, content extent bar 30 can be representative of the extent of the note content from the first character or object to the last. As an alternative, content extent bar 30 could be displayed to extend vertically along either side of software note 20. In either case, content extent bar 30 provides a graphically simple indication of the extent of content within software note 20.

For additional ease, up and down controls 34, 36 provide another means to allow a user to move through the note contents from beginning to end. When the user clicks up control 34, display device 18 shows a portion of the note contents that is closer to the beginning. Conversely, when the user clicks down control 36, display device 18 shows a portion of the note contents that is closer to the end. In this case, processor 12 can control display device 18 to scroll content area 22 in a fixed amount in response to each click. In addition, display device 18 can be controlled to provide continuous scrolling when up or down controls 34, 36 are held down, i.e., continuously clicked, for an extended period of time. Notably, placement of up and down controls 34, 36 adjacent to one another makes the user's task easier. Specifically, the adjacent positioning of up and down controls 34, 36 reduces the distance of travel for alternative selection of up and down scrolling via a pointing device.

Figure 3:
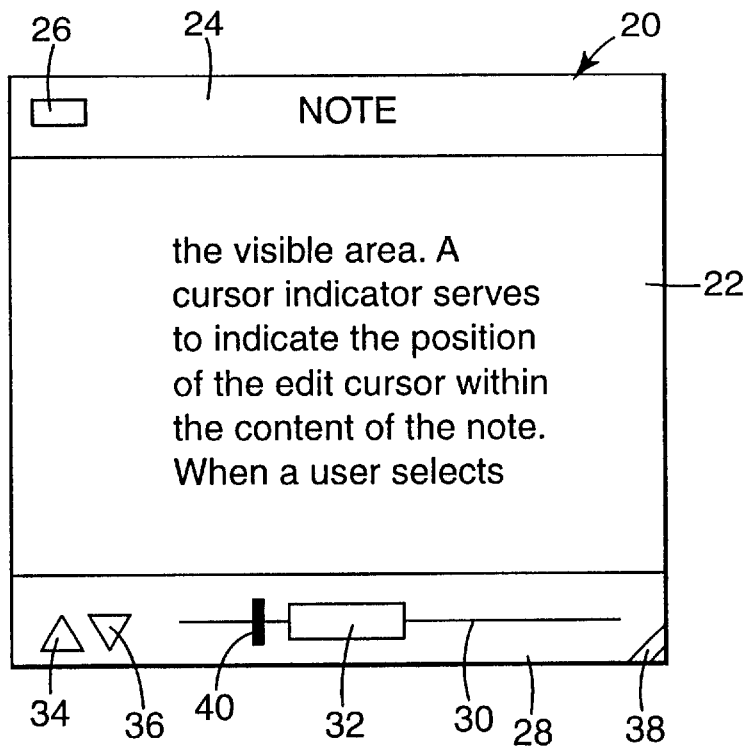
FIG. 3 is a diagram of a software note illustrating the concept of a cursor indicator.

As further shown in FIG. 2, an edit cursor 39 can be displayed within content area 22 of software note 20 to indicate the current position for entry of text by a user. When the note content is scrolled beyond content area 22, cursor 39 may not be visible to the user. FIG. 3 is a diagram of a software note 20 illustrating the concept of a cursor indicator. To help the user locate edit cursor 39, the application program code can be arranged such that processor 12 causes display device 18 to display a cursor indicator 40 relative to content extent bar 30.

Cursor indicator 40 can be displayed on or adjacent to content extent bar 30 to indicate the position of edit cursor 39 within the overall content extent. As the position of edit cursor 39 changes, cursor indicator 40 similarly moves relative to content extent bar 30. In this manner, the user can be made constantly aware of the position of edit cursor 39, either by convenient reference to cursor indicator 40, or by viewing the edit cursor when it is visible within content area 22.

Cursor indicator 40 may take the form of a short bar or vertical line. Alternatively, cursor indicator 40 could be designated by a symbol or character. For greater visibility, cursor indicator 40 can have a color that contrasts with content extent bar 30 and current view bar 32. Further, cursor indicator 40 can be displayed in either a static or blinking mode on display device 18. When edit cursor 39 is visible within content area 20, cursor indicator 40 can be hidden, or highlighted in a different color.

With cursor indicator 40, the user can drag current view bar 32 or manipulate up and down controls 34, 36 to scroll the note content to the indicated area. In particular, as the user scrolls the note content, current view bar 32 moves to indicate the position of the content presently visible in content area 22. Consequently, the position of current view bar 32 on content extent bar 30 is updated relative to cursor indicator 40, providing an indication of the present proximity to edit cursor 39. Moreover, the user can simply click on cursor indicator 40, or on a position on content extent bar 30 adjacent the cursor indicator, to quickly reveal a portion of the note content containing edit cursor 39 within content area 22. This feature can help the user save time in locating edit cursor 39 for text entry, again providing one-click direct access to a desired area.

Figure 4:
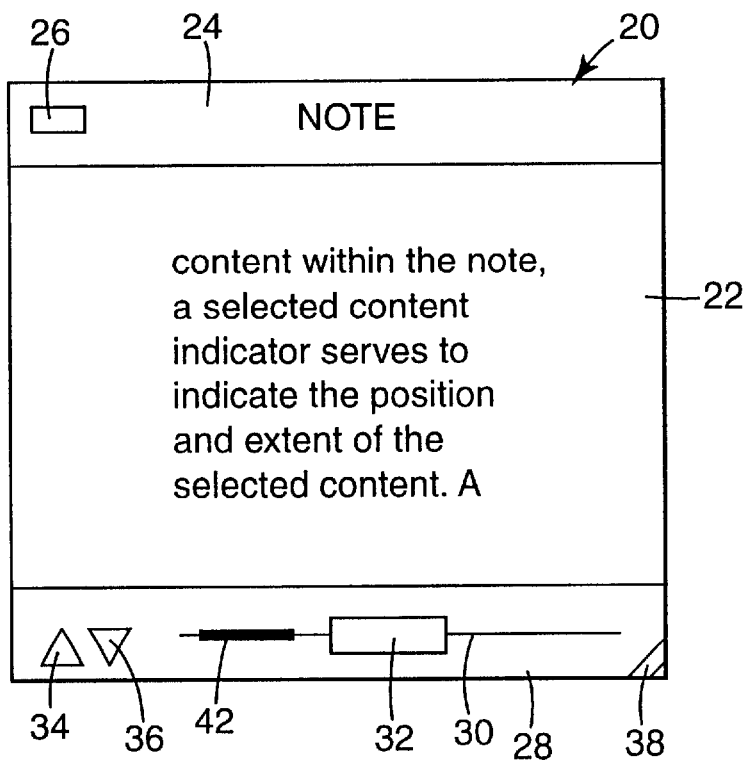
FIG. 4 is a diagram of a software note illustrating the concept of a selected text indicator.

FIG. 4 is a diagram of a software note 20 illustrating the concept of a selected text indicator. In the event the user marks a portion of the text, e.g., for a cut, copy, or formatting operation, processor 12 controls display device 18 to display a selected content indicator 42. Like current view bar 32 and cursor indicator 40, selected content indicator 42 also can be displayed relative to content extent bar 30 to indicate a position of a selected portion of the note content. Also, selected content indicator 42 can take the form of a solid or dashed bar that extends on or adjacent to content extent bar 30.

The selection of contrasting colors may be desirable, particularly to distinguish selected content indicator 42 from current view bar 32. Display of selected content indicator 42 in a blinking mode also may be desirable. Further, as shown in FIG. 4, current view bar 32 and selected content indicator can have different sizes. In response to user input selecting a different portion of the note content, selected content indicator 42 is moved to indicate the position of the different selected portion. In addition, selected content indicator 42 can be sized to indicate the extent of the selected portion of the note content relative to the content extent.

To view the selected content area, the user can drag current view bar 32 or manipulate up and down controls 34, 36 to scroll content area 22. Alternatively, the user can simply click on a position on content extent bar 30 or on selected content indicator 42 for one-click direct access to the selected content area. In response, the selected content is immediately displayed within content area 22, and centered about the specified position. Thus, selected content indicator 42 greatly simplifies the user's task in locating selected portions of the note content for edit operations.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for controlling presentation of the content of a note on a display, the method comprising:
    displaying a portion of the note content;
    displaying a content extent bar representative of the extent of the note content, the content extent bar extending in a horizontal direction;
    processing user input specifying a position on the content extent bar, the specified position being representative of a corresponding position in the note content; and
    displaying a different portion of the note content proximate to the corresponding position.

2. The method of claim 1, wherein the act of displaying a different portion of the note content includes moving vertically to the different portion in the note content.

3. The method of claim 1, further comprising:
    displaying a current view bar relative to the content extent bar, the current view bar indicating a position of a currently displayed portion of the note content within the content extent; and
    moving the current view bar relative to the content extent bar upon display of the different portion of the note content to indicate the position of the different portion of the note content within the content extent.

4. The method of claim 3, further comprising:
    processing user input specifying movement of the current view bar relative to the content extent bar; and
    displaying a different portion of the note content based on the position of the current view bar following movement of the current view bar.

5. The method of claim 4, wherein the act of displaying a different portion of the note content based on the position of the current view bar includes displaying a different portion of the note content at a position relative to the content extent that is approximately proportional to a position of the current view bar relative to the content extent bar.

6. The method of claim 1, further comprising displaying a cursor indicator relative to the content extent bar to indicate a position of an edit cursor within the content extent.

7. The method of claim 6, further comprising:
    processing user input selecting the cursor indicator; and
    displaying, in response to the user input selecting the cursor indicator, a portion of the note content containing the edit cursor.

8. The method of claim 1, further comprising displaying a selected content indicator relative to the content extent bar to indicate a position of a selected portion of the note content within the content extent.

9. The method of claim 8, further comprising:
    processing user input selecting a different portion of the note content; and
    moving the selected content indicator relative to the content extent bar to indicate the position of the different selected portion of the note content within the content extent.

10. The method of claim 9, further comprising sizing the selected content indicator to indicate an extent of the selected portion of the note content relative to the content extent.

11. The method of claim 1, further comprising:
    displaying up and down scroll controls for the content extent bar adjacent one another;
    vertically scrolling the note content upward in response to user selection of the down scroll control; and vertically scrolling the note content downward in response to user selection of the down scroll control.

12. A method for controlling presentation of the content of a note on a display, the method comprising:

displaying a portion of the note content;

displaying a content extent bar representative of the extent of the note content, the content extent bar extending in a horizontal direction; and displaying a cursor indicator relative to the content extent bar to indicate a position of an edit cursor within the content extent.

13. The method of claim 12, further comprising:

processing user input selecting the cursor indicator; and displaying, in response to the user input selecting the cursor indicator, a portion of the note content containing the edit cursor.

14. The method of claim 12, further comprising:

processing user input specifying a position on the content extent bar, the specified position being representative of a corresponding position in the note content; and displaying a different portion of the note content proximate to the corresponding position.

15. The method of claim 12, further comprising:

processing user input specifying a position on the content extent bar; and displaying a different portion of the note content by moving vertically to the different portion in the note content.

16. The method of claim 12, further comprising:

displaying a current view bar relative to the content extent bar, the current view bar indicating a position of a currently displayed portion of the note content within the content extent; and moving the current view bar relative to the content extent bar upon display of the different portion of the note content to indicate the position of the different portion of the note content within the content extent.

17. The method of claim 16, further comprising:

processing user input to move the current view bar relative to the content extent bar to thereby select the position of the different portion of the note content; and displaying the different portion of the note content based on the position of the current view bar following movement of the current view bar.

18. The method of claim 17, wherein the act of displaying the different portion of the note content based on the position of the current view bar includes displaying a different portion of the note content at a position relative to the content extent that is approximately proportional to a position of the current view bar relative to the content extent bar.

19. The method of claim 12, further comprising displaying a selected content indicator relative to the content extent bar to indicate a position of a selected portion of the note content within the content extent.

20. The method of claim 19, further comprising:

processing user input selecting a different portion of the note content; and moving the selected content indicator relative to the content extent bar to indicate the position of the different selected portion of the note content within the content extent.

21. The method of claim 20, further comprising sizing the selected content indicator to indicate an extent of the selected portion of the note content relative to the content extent.

22. The method of claim 12, further comprising:

displaying up and down scroll controls for the content extent bar adjacent one another;

vertically scrolling the note content upward in response to user selection of the up scroll control; and vertically scrolling the note content downward in response to user selection of the down scroll control.

23. A method for controlling presentation of the content of a note on a display, the method comprising:

displaying a portion of the note content;

displaying a content extent bar that indicates the extent of the note content; and displaying a selected content indicator relative to the content extent bar to indicate a position of a selected portion of the note content within the content extent, the selected content indicator sized to indicate an extent of the selected portion of the note content relative to the content extent.

24. The method of claim 23, further comprising:

processing user input selecting a different portion of the note content; and moving the selected content indicator relative to the content extent bar to indicate the position of the different selected portion of the note content within the content extent.

25. The method of claim 23, further comprising:

processing user input specifying a position on the content extent bar, the specified position being representative of a corresponding position in the note content; and displaying a different portion of the note content proximate to the corresponding position.

26. The method of claim 23, further comprising:

displaying the content extent bar to extend in a horizontal direction; processing user input specifying a position on the content extent bar; and displaying a different portion of the note content by moving vertically to the different portion in the note content.

27. The method of claim 23, further comprising:

displaying a current view bar relative to the content extent bar, the current view bar indicating a position of a currently displayed portion of the note content within the content extent; and moving the current view bar relative to the content extent bar upon display of the different portion of the note content to indicate the position of the different portion of the note content within the content extent.

28. The method of claim 27, further comprising:

processing user input to move the current view bar relative to the content extent bar to thereby select the position of the different portion of the note content; and displaying the different portion of the note content based on the position of the current view bar following movement of the current view bar.

29. The method of claim 28, wherein the act of displaying the different portion of the note content based on the position of the current view bar includes displaying a different portion of the note content at a position relative to the content extent that is approximately proportional to a position of the current view bar relative to the content extent bar.

30. The method of claim 27, further comprising:

displaying a cursor indicator relative to the content extent bar to indicate a position of an edit cursor within the content extent;

processing user input selecting the cursor indicator; and displaying, in response to the user input selecting the cursor indicator, a portion of the note content containing the edit cursor.

31. The method of claim 23, further comprising:

displaying up and down scroll controls for the content extent bar adjacent one another;

vertically scrolling the note content upward in response to user selection of the up scroll control; and vertically scrolling the note content downward in response to user selection of the down scroll control.

32. A method for controlling presentation of a note displayed on a computer display, the method comprising:

displaying a portion of the content of the note;

displaying a content extent bar with a horizontal orientation on the computer display, the content extent bar indicating the extent of content of the displayed note;

displaying a current view bar that is movable relative to the content extent bar to indicate a position of a currently displayed portion of the note content within the content extent;

displaying a cursor indicator that is movable relative to the content extent bar to indicate a position of an edit cursor within the content extent;

displaying a selected content indicator that is movable and sizable relative to the content extent bar to indicate a position and size of a selected portion of the note content within the content extent;

processing user input specifying a different portion of the note content to be displayed;

displaying a different portion of the note content by moving vertically to the different portion in the note content; and moving the current view bar relative to the content extent bar to indicate a position of the different portion of the note content within the content extent.

33. The method of claim 32, further comprising:

processing user input specifying a different selected portion of the note content; and moving and sizing the selected content indicator relative to the content extent bar to indicate the position and size of the different selected portion within the content extent.

34. The method of claim 32, further comprising:

processing user input selecting the cursor indicator; and displaying, in response to selection of the cursor indicator, a different portion of the note content containing the edit cursor.

35. An article of manufacture encoded with computer-readable program code arranged such that, upon execution by a computer, the computer controls presentation of the content of a note on a display, the computer performing the acts of:

displaying a portion of the note content;

displaying a content extent bar representative of the extent of the note content, the content extent bar extending in a horizontal direction;

processing user input specifying a position on the content extent bar, the specified position being representative of a corresponding position in the note content; and displaying a different portion of the note content proximate to the corresponding position.

36. An article of manufacture encoded with computer-readable program code arranged such that, upon execution by a computer, the computer controls presentation of the content of a note on a display, the computer performing the acts of:

displaying a portion of the note content;

displaying a content extent bar representative of the extent of the note content, the content extent bar extending in a horizontal direction; and displaying a cursor indicator relative to the content extent bar to indicate a position of an edit cursor within the content extent.

37. An article of manufacture encoded with computer-readable program code arranged such that, upon execution by a computer, the computer controls presentation of the content of a note on a display, the computer performing the acts of:

displaying a portion of the note content;

displaying a content extent bar that indicates the extent of the note content; and displaying a selected content indicator relative to the content extent bar to indicate a position of a selected portion of the note content within the content extent, the selected content indicator sized to indicate an extent of the selected portion of the note content relative to the content extent.

38. An article of manufacture encoded with computer-readable program code arranged such that, upon execution by a computer, the computer controls presentation of the content of a note on a display, the computer performing the acts of:

displaying a portion of the content of the note;

displaying a content extent bar with a horizontal orientation on the computer display, the content extent bar indicating the extent of content of the displayed note;

displaying a current view bar that is movable relative to the content extent bar to indicate a position of a currently displayed portion of the note content within the content extent;

displaying a cursor indicator that is movable relative to the content extent bar to indicate a position of an edit cursor within the content extent;

displaying a selected content indicator that is movable and sizable relative to the content extent bar to indicate a position and size of a selected portion of the note content within the content extent;

processing user input specifying a different portion of the note content to be displayed;

displaying a different portion of the note content by moving vertically to the different portion in the note content; and moving the current view bar relative to the content extent bar to indicate a position of the different portion of the note content within the content extent.

* * * * *